(12) United States Patent
Yamashiro

(10) Patent No.: US 11,697,202 B2
(45) Date of Patent: Jul. 11, 2023

(54) JOINT SHAFT STRUCTURE AND HORIZONTAL ARTICULATED ROBOT

(71) Applicant: FANUC CORPORATION, Yamanashi (JP)

(72) Inventor: Hikaru Yamashiro, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 505 days.

(21) Appl. No.: 16/117,423

(22) Filed: Aug. 30, 2018

(65) Prior Publication Data
US 2019/0105786 A1  Apr. 11, 2019

(30) Foreign Application Priority Data

Oct. 10, 2017 (JP) ................................ 2017-196698

(51) Int. Cl.
*B25J 9/10* (2006.01)
*B25J 19/00* (2006.01)
(Continued)

(52) U.S. Cl.
CPC .............. *B25J 9/1025* (2013.01); *B25J 9/044* (2013.01); *B25J 17/00* (2013.01); *B25J 19/0062* (2013.01);
(Continued)

(58) Field of Classification Search
CPC ........ B25J 17/00; B25J 19/0062; B25J 9/044; B25J 9/1025; F16H 2057/02034; F16H 49/001; F16H 57/021; F16H 57/031
See application file for complete search history.

(56) References Cited

U.S. PATENT DOCUMENTS

| 4,784,014 A | 11/1988 | Bruns et al. |
| 5,850,765 A * | 12/1998 | Shirasawa ............. F16H 49/001 74/640 |

(Continued)

FOREIGN PATENT DOCUMENTS

| CN | 101260932 A | 9/2008 |
| CN | 103153555 A | 6/2013 |

(Continued)

OTHER PUBLICATIONS

Usui, Takumi; Notice of Reasons for Refusal for Japanese Application No. 2017-196698; dated Jul. 30, 2019; 5 pages.
(Continued)

*Primary Examiner* — Joseph Brown
(74) *Attorney, Agent, or Firm* — Shackelford, Bowen, McKinley & Norton, LLP

(57) ABSTRACT

A joint shaft structure includes: a base member; an output shaft member supported on one side of the base member so as to be rotatable; and a strain wave gear reducer rotating the shaft member relative to the base member by transmitting rotation of a motor to the shaft member while reducing the speed of the rotation. The reducer includes: a wave generator fixed to a shaft rotated by a driving force from the motor; a flexspline having, at one end, an elastic part which includes a plurality of external teeth and inside which the generator is fitted; and a ring gear disposed on a radially outer side of the flexspline and fixed to the shaft member, and having internal teeth meshing with the external teeth. The flexspline is fixed to the base member at the other end disposed farther on the base member side than the elastic part.

7 Claims, 7 Drawing Sheets

(51) Int. Cl.
  *B25J 9/04*      (2006.01)
  *B25J 17/00*     (2006.01)
  *F16H 49/00*     (2006.01)
  *F16H 57/021*    (2012.01)
  *F16H 57/031*    (2012.01)
  *F16H 57/02*     (2012.01)

(52) U.S. Cl.
  CPC ......... *F16H 49/001* (2013.01); *F16H 57/021* (2013.01); *F16H 57/031* (2013.01); *F16H 2057/02034* (2013.01)

(56) References Cited

U.S. PATENT DOCUMENTS

| | | | |
|---|---|---|---|
| 6,182,532 B1* | 2/2001 | Shirasawa | F16H 49/001 |
| | | | 74/640 |
| 8,616,086 B2* | 12/2013 | Hirai | B25J 9/1025 |
| | | | 74/640 |
| 2006/0133918 A1 | 6/2006 | Akaha | |
| 2007/0110554 A1* | 5/2007 | Ono | B25J 9/1065 |
| | | | 414/744.5 |
| 2008/0245172 A1 | 10/2008 | Kiyosawa et al. | |
| 2009/0024142 A1 | 1/2009 | Ruiz Morales | |
| 2013/0068060 A1 | 3/2013 | Xu et al. | |
| 2013/0139636 A1 | 6/2013 | Tanioka | |
| 2013/0319151 A1 | 12/2013 | Kanai | |
| 2013/0327179 A1 | 12/2013 | Yeh | |
| 2015/0167814 A1 | 6/2015 | Kanai | |
| 2016/0089779 A1 | 3/2016 | Hahakura et al. | |
| 2017/0312924 A1* | 11/2017 | Kinoshita | B25J 17/00 |
| 2019/0036419 A1 | 1/2019 | Ayuzawa et al. | |
| 2020/0003288 A1 | 1/2020 | Mendel et al. | |

FOREIGN PATENT DOCUMENTS

| | | |
|---|---|---|
| CN | 103562594 A | 2/2014 |
| DE | 3522336 A1 | 1/1987 |
| DE | 602005005429 T2 | 7/2009 |
| EP | 1671755 A1 | 6/2006 |
| EP | 1815950 A1 | 8/2007 |
| EP | 3002087 A1 | 4/2016 |
| EP | 3439152 A1 | 2/2019 |
| JP | S58-211890 A | 12/1983 |
| JP | S63-500086 A | 1/1988 |
| JP | H09-250610 A | 9/1997 |
| JP | 2006-167864 A | 6/2006 |
| JP | 2009-525098 A | 7/2009 |
| JP | 2009-233824 A | 10/2009 |
| JP | 2009-269126 A | 11/2009 |
| JP | 2010-269412 A | 12/2010 |
| JP | 2013-006238 A | 1/2013 |
| JP | 2014-151369 A | 8/2014 |
| JP | 2016-68200 A | 5/2016 |
| JP | 2016-215371 A | 12/2016 |
| JP | 2017-184430 A | 10/2017 |
| WO | WO-2007088208 A1 | 8/2007 |

OTHER PUBLICATIONS

Murayama, Y., "An Introduction to HarmonicDrive® and Strain Wave Gearing," Journal of the Japan Society for Precision Engineering, vol. 83, No. 8, The Japan Society for Precision Engineering, 2017, 21 pages.

The State Intellectual Property Office of the People's Republic of China; First Office Action; Chinese Patent Application No. 201811133539.9; dated Apr. 20, 2020; 6 pages.

Examining Division for Class B25J; Rackl; German Office Action; German Application No. 102018216974.8; dated Apr. 16, 2021; 10 pages.

* cited by examiner prior art

JOINT SHAFT STRUCTURE AND HORIZONTAL ARTICULATED ROBOT

CROSS-REFERENCE TO RELATED APPLICATIONS

This application claims the benefit of Japanese Patent Application No. 2017-196698, the content of which is incorporated herein by reference.

TECHNICAL FIELD

The present invention relates to a joint shaft structure and a horizontal articulated robot.

BACKGROUND ART

A horizontal articulated robot having a joint shaft structure including a strain wave gear reducer is conventionally known (e.g., see Patent Literature 1). This horizontal articulated robot has a joint shaft structure in which a flexspline, of which a leading end has a shape of a thin-walled cylinder elastically deformable in a radial direction, is inserted so as to fit over a wave generator fixed to a shaft that is rotated around a longitudinal axis as a driving force from a motor is transmitted thereto.

CITATION LIST

Patent Literature

{PTL 1}
Japanese Unexamined Patent Application, Publication No. 2016-68200

SUMMARY OF INVENTION

As an aspect of the present invention, a joint shaft structure is provided that includes: a base member; an output shaft member that is supported on one side of the base member so as to be rotatable around a rotational axis; and a strain wave gear reducer that rotates the output shaft member relative to the base member by transmitting rotation of a motor disposed on the base member side to the output shaft member while reducing the speed of the rotation. The strain wave gear reducer includes: a wave generator fixed to a shaft that is rotated around a longitudinal axis coinciding with the rotational axis by a driving force from the motor; a substantially cylindrical flexspline having, at one end, an elastic part which has a shape of a thin-walled cylinder elastically deformable in a radial direction and includes a plurality of external teeth arrayed in a circumferential direction on an outer circumferential surface, and inside which the wave generator is fitted; and a ring gear that is disposed on a radially outer side of the flexspline and fixed to the output shaft member, and has internal teeth meshing with the external teeth. The flexspline is fixed to the base member at the other end that is disposed farther on the base member side than the elastic part.

DESCRIPTION OF EMBODIMENTS

Figure 1:
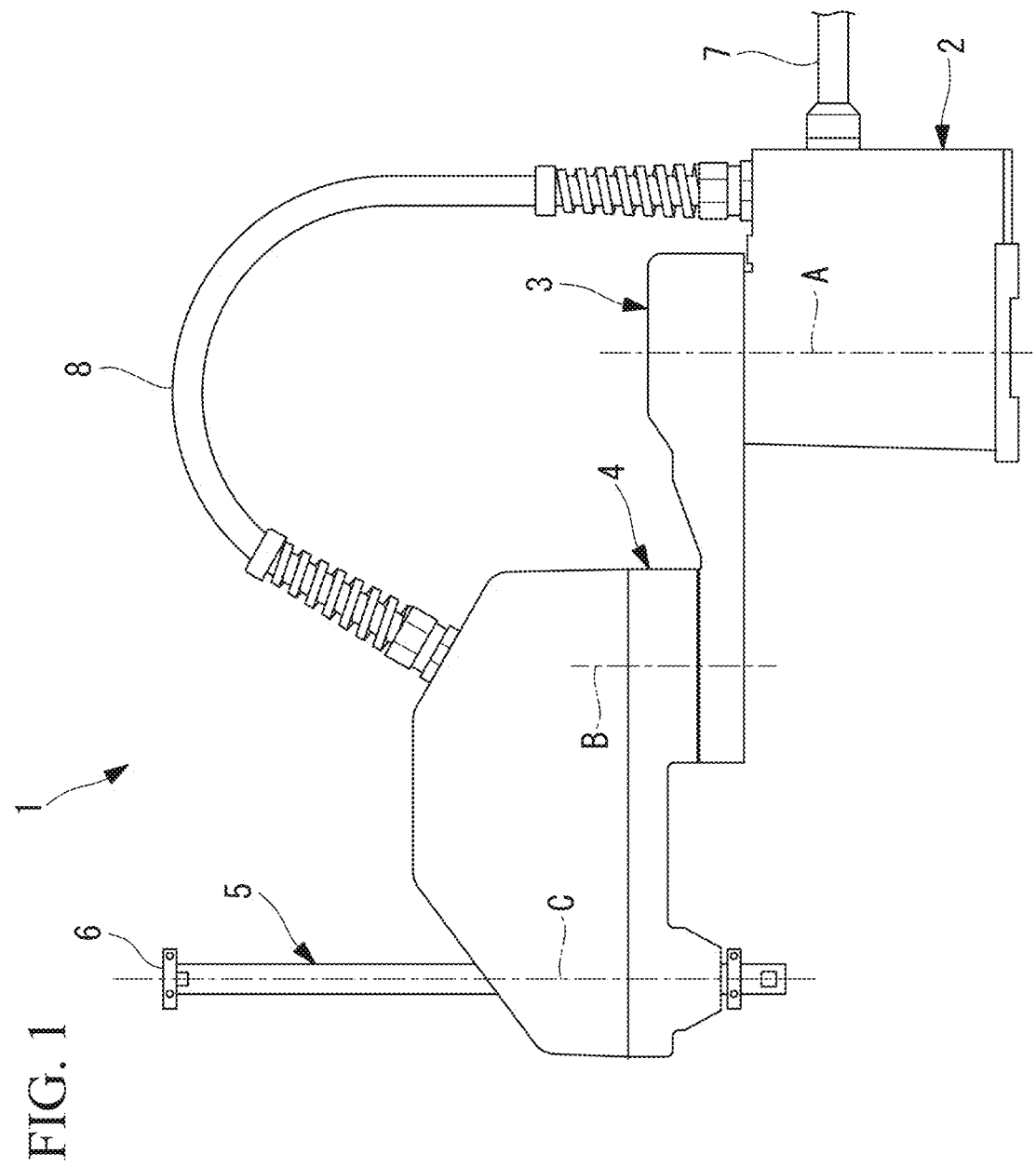
FIG. 1 is a side view showing an example of a horizontal articulated robot including a joint shaft structure according to an embodiment of the present invention.
Figure 2:
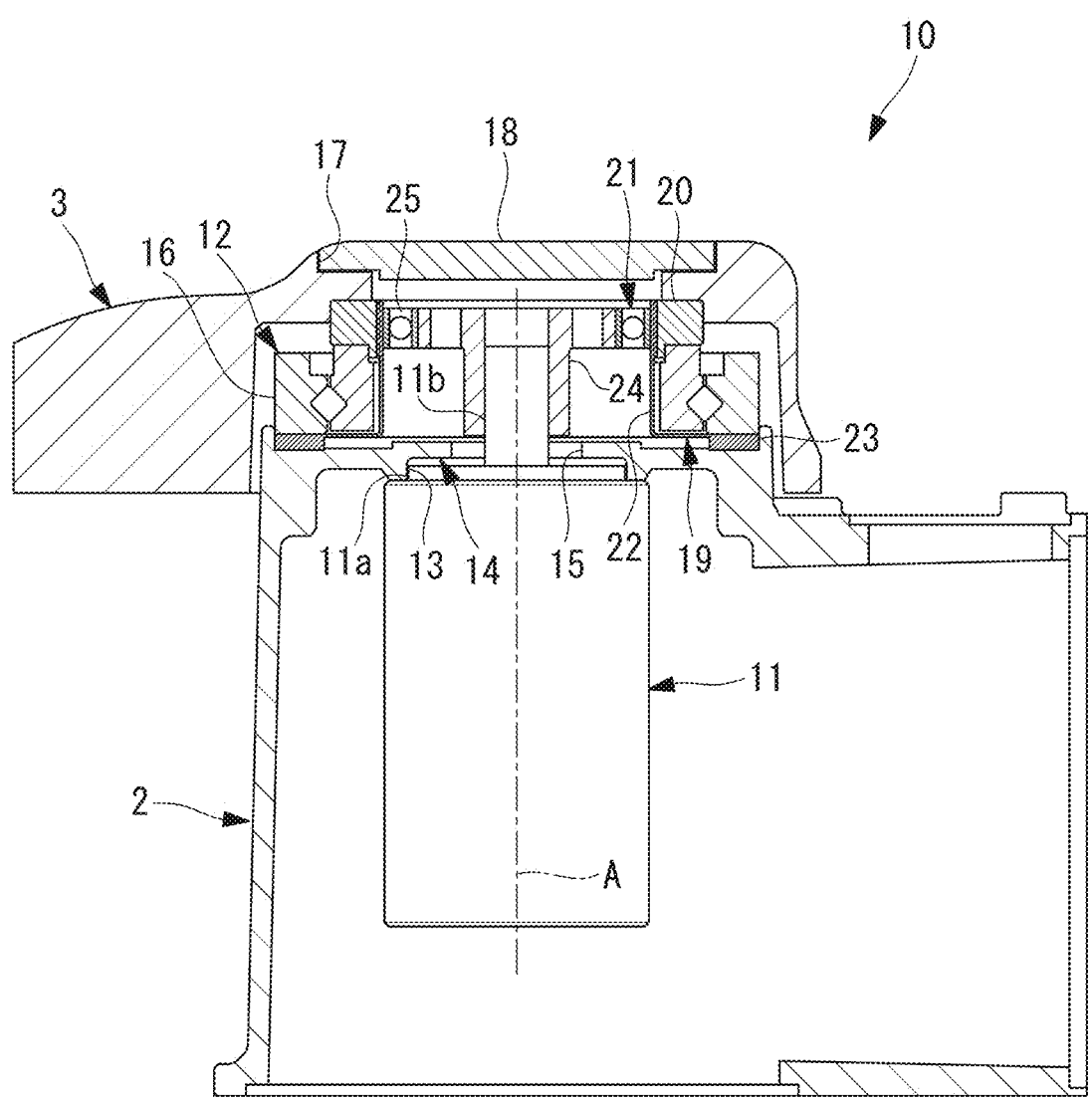
FIG. 2 is a vertical sectional view showing the joint shaft structure of the horizontal articulated robot of FIG. 1.
Figure 4:
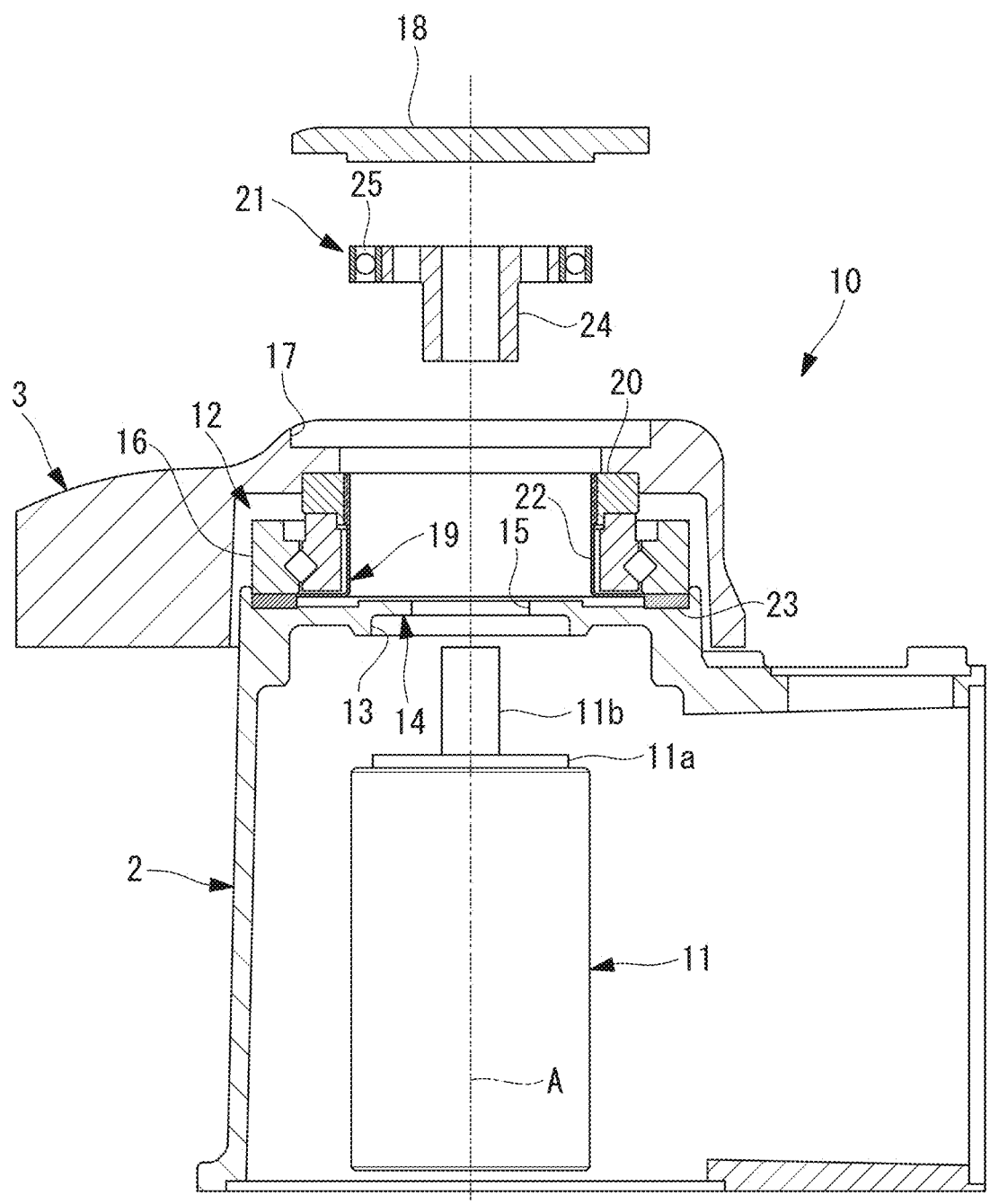
FIG. 4 is an exploded vertical sectional view of the joint shaft structure of FIG. 2.
Figure 5:
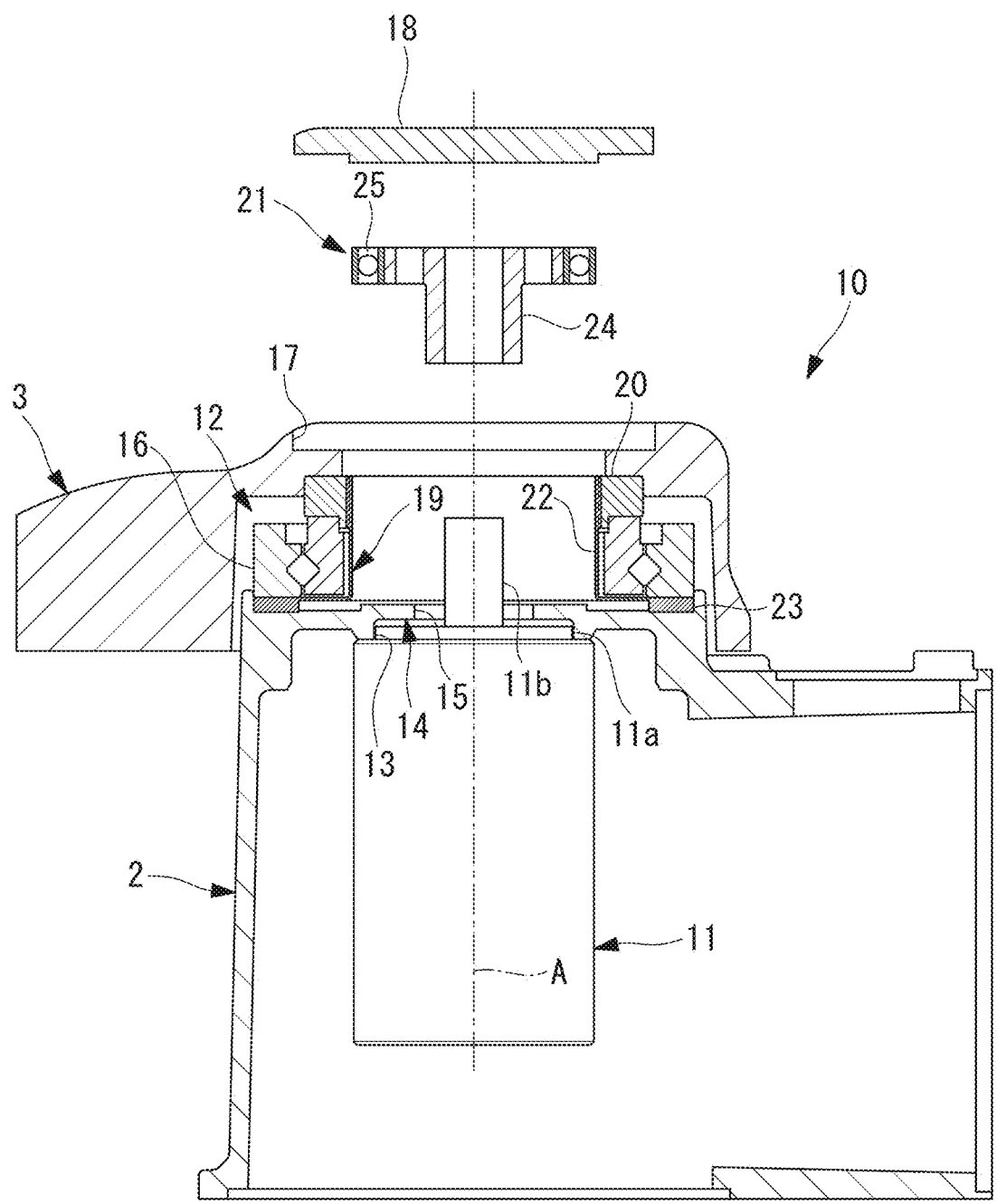
FIG. 5 is an exploded vertical sectional view showing a state where a motor has been mounted on a base member from the state of FIG. 4.

A joint shaft structure 10 and a horizontal articulated robot 1 according to an embodiment of the present invention will be described below with reference to the drawings.
As shown in FIG. 1, the horizontal articulated robot 1 according to this embodiment includes: a base member 2 installed on an installation surface; a first arm (output shaft member) 3 that is horizontally rotated around a first axis (rotational axis, longitudinal axis) A vertical to the base member 2; a second arm 4 that is provided at a leading end of the first arm 3 and horizontally rotated around a second axis B parallel to the first axis A; an elevating shaft 5 that is provided at a leading end of the second arm 4 and moved in a direction along a third axis C parallel to the second axis B; and a wrist shaft 6 that rotates a leading end of the elevating shaft 5 around the third axis C.
In FIG. 1, reference sign 7 denotes a cable through which power and signals sent from a controller (not shown) are supplied to the horizontal articulated robot 1, and reference sign 8 denotes a cable through which the power and signals are supplied to a motor installed on the second arm 4.
The joint shaft structure 10 according to this embodiment is included in the horizontal articulated robot 1 of FIG. 1, and includes, as shown in FIG. 2, the base member 2, the first arm 3 disposed on an upper part of the base member 2 so as to be rotatable around the first axis A, and a strain wave gear reducer 12 that transmits rotation of a motor 11 disposed inside the base member 2 to the first arm 3 while reducing the speed of the rotation.
The base member 2 houses the motor 11 that rotates the first arm 3, in a hollow inner part thereof. A motor mount 14 including a socket 13 into which a protrusion 11a of the motor 11 is fitted is provided in a lower surface of a ceiling of the base member 2. Fitting the protrusion 11a of the motor 11 into the socket 13 of the motor mount 14 can position a longitudinal axis of a motor shaft 11b of the motor 11 at the right position and in the right direction.
Moreover, a through-hole 15 through which the motor shaft 11b of the motor 11 to be mounted on the motor mount 14 is passed is provided in the ceiling of the base member 2.
As shown in FIG. 4 and FIG. 5, the motor 11 is fixed to the motor mount 14 with the motor shaft 11b passed through the through-hole 15 from below the ceiling of the base member 2 and with the protrusion 11a fitted into the socket 13, and thus the longitudinal axis of the motor shaft 11b can be disposed in a vertical direction.
The first arm 3 is rotatably mounted on the base member 2 through a bearing 16 so as to rotate around the rotational axis A that coincides with the longitudinal axis of the motor shaft 11b disposed in the vertical direction. An opening 17 having an opening diameter larger than the inside diameter of a flexspline 19, to be described later, is provided at a position in the first arm 3 facing the flexspline 19 from a vertically upper side. A cover 18 that closes the opening 17 in an openable manner is mounted over the opening 17.

Figure 3:
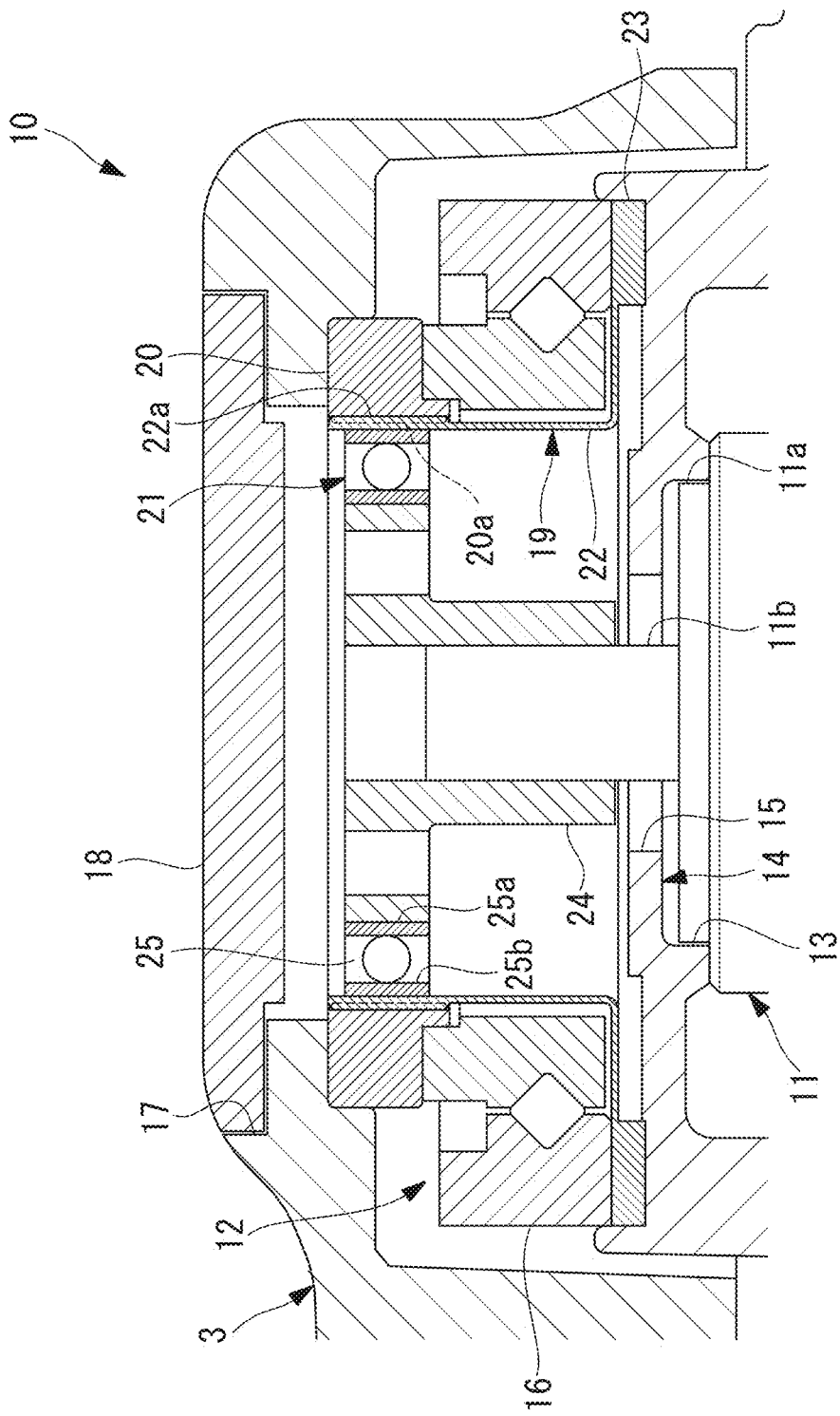
FIG. 3 is a partial, enlarged vertical sectional view showing a strain wave gear reducer included in the joint shaft structure of FIG. 2.

As shown in FIG. 3, the strain wave gear reducer 12 includes the flexspline 19 fixed to the base member 2, a ring gear 20 fixed to the first arm 3, and a wave generator 21 fixed to the motor shaft 11b.

The flexspline 19 has a substantially cylindrical shape, and has, at one end, an elastic part 22 having a shape of a thin-walled cylinder elastically deformable in a radial direction, and has, at the other end, a flange 23 having higher rigidity than the elastic part 22 and having a shape extending radially outward. The flexspline 19 is fixed to the base member 2 at the flange 23. Thus, the flexspline 19 is disposed such that a central axis thereof coincides with the rotational axis A of the first arm 3, with the one end provided with the elastic part 22 facing vertically upward and the other end provided with the flange 23 facing vertically downward.

The elastic part 22 of the flexspline 19 has a plurality of external teeth 22a disposed in a row in a circumferential direction on an outer circumferential surface thereof. The wave generator 21 is fitted on an inner circumferential surface of the elastic part 22.

The ring gear 20 is disposed on a radially outer side of the elastic part 22 of the flexspline 19, and has a plurality of internal teeth 20a that meshes with the external teeth 22a of the flexspline 19.

The wave generator 21 includes an elliptical cam 24 that is fixed to the motor shaft 11b of the motor 11 mounted on the motor mount 14, and an elastic bearing 25 of which an inner ring 25a is fixed to an outer circumferential surface of the elliptical cam 24. An outer ring 25b of the elastic bearing 25 fits on an inner surface of the flexspline 19 at the position of the elastic part 22.

In this case, in the joint shaft structure 10 according to this embodiment, the flexspline 19 is disposed with the elastic part 22 facing upward, which allows the elastic part 22 of the flexspline 19 and the wave generator 21 fitted in the elastic part 22 to be disposed close to the opening 17 that is provided so as to face the elastic part 22. As a result, one can open the opening 17 of the first arm 3 and expose the ring gear 20, the elastic part 22 of the flexspline 19, and the wave generator 21 near at hand by removing the cover 18 closing the opening 17. Thus, this structure has an advantage of easy lubrication and maintenance.

Figure 6:
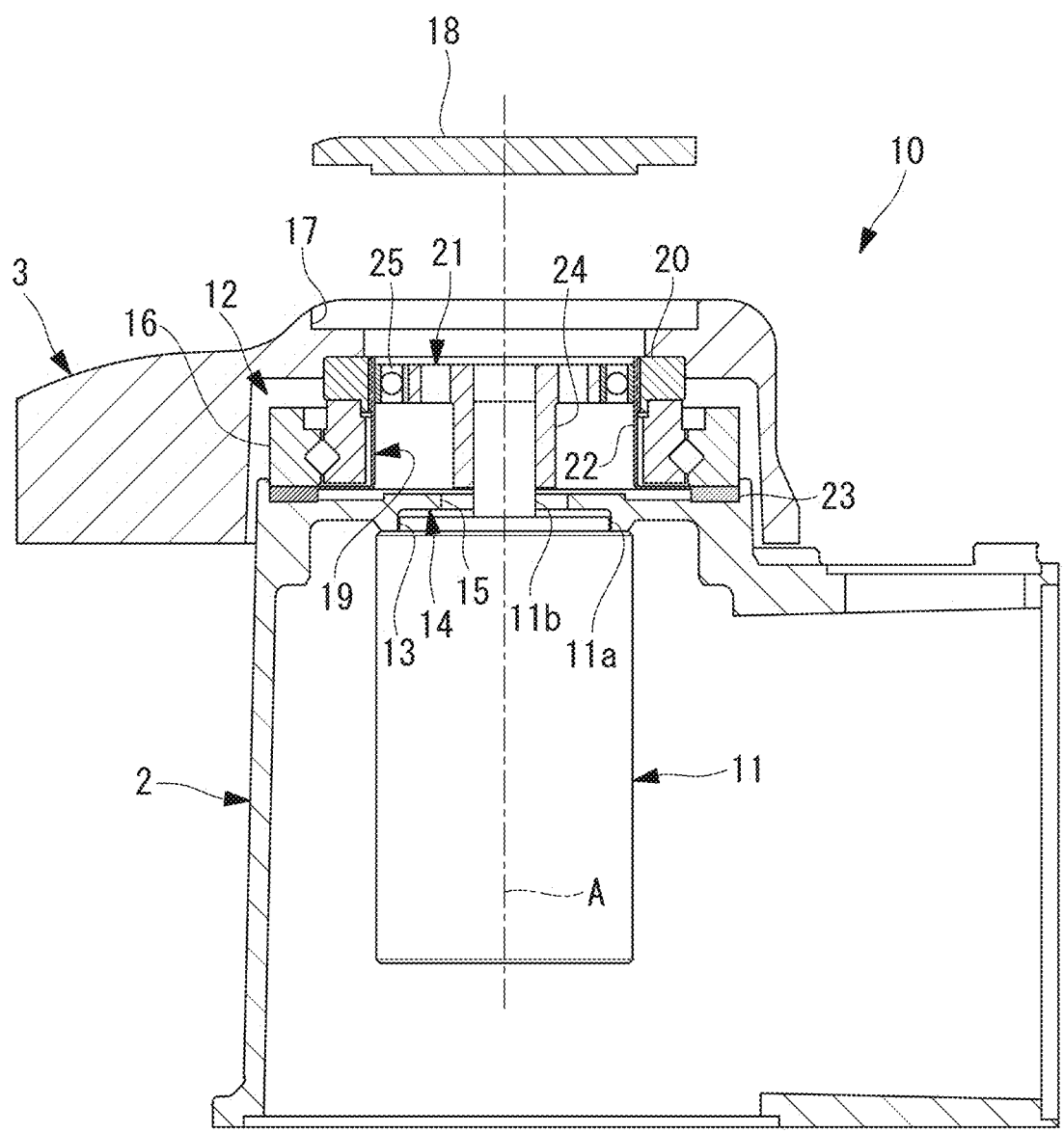
FIG. 6 is an exploded vertical sectional view showing a state where a wave generator has been mounted from the state of FIG. 5.

Specifically, in this embodiment, the wave generator 21 is not mounted on the motor shaft 11b in advance. Instead, as shown in FIG. 5, the motor 11 is mounted from below the flexspline 19 that is disposed with the elastic part 22 facing upward, and the motor shaft 11b is disposed at the center of the flexspline 19. From this state, as shown in FIG. 6, the wave generator 21 is fitted into the flexspline 19 and mounted on the motor shaft 11b through the opening 17 from which the cover 18 has been removed.

To remove the wave generator 21, the wave generator 21 can be removed from above the first arm 3 by the reverse procedure. Thus, it is possible to shorten the lubrication path to the ring gear 20, the flexspline 19, and the wave generator 21 and thereby improve the maintainability.

Figure 7:
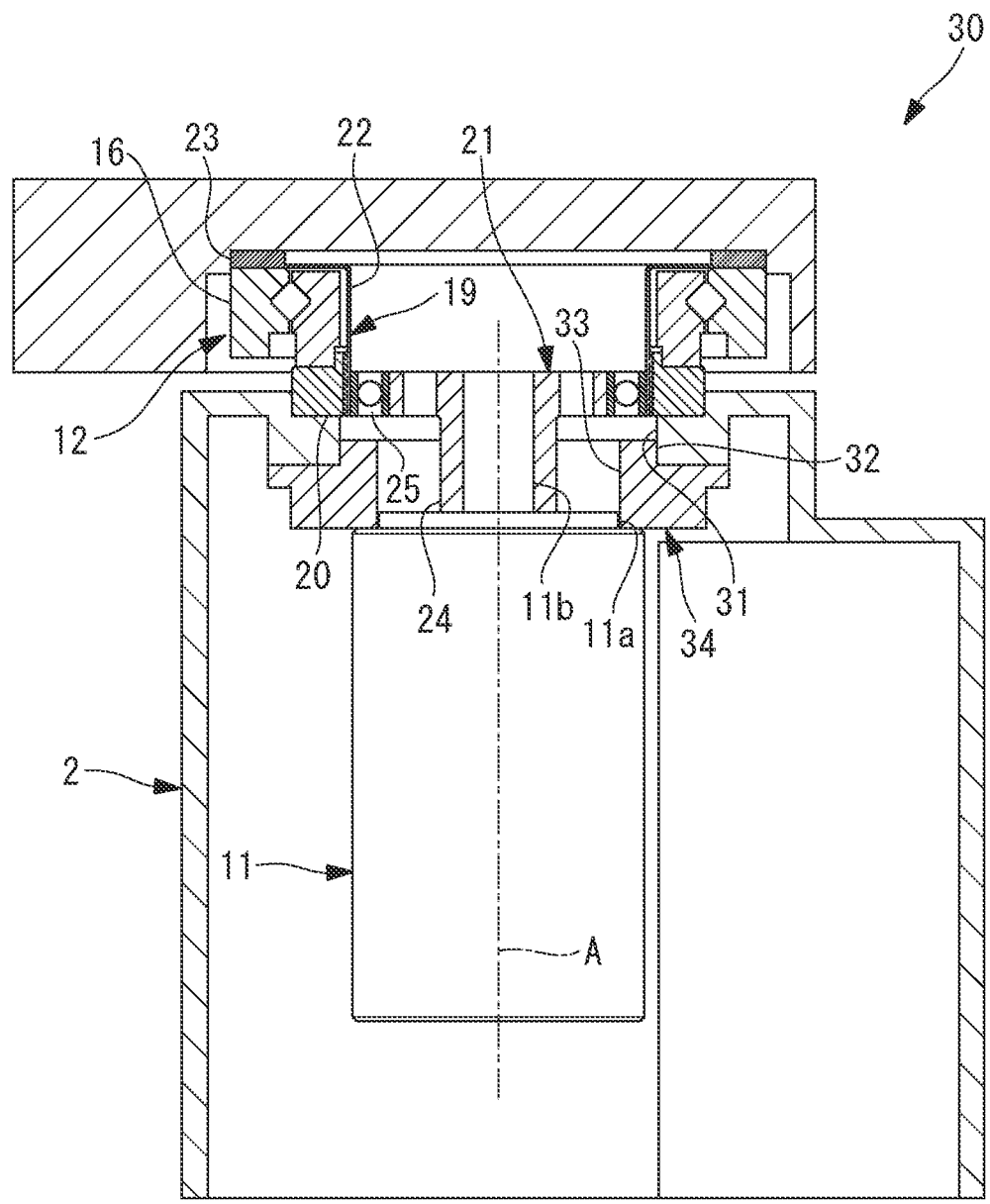
FIG. 7 is a vertical sectional view showing a reference example of a joint shaft structure.

By contrast, when the wave generator 21 that is mounted on the motor shaft 11b in advance is fitted into the elastic part 22 of the flexspline 19, as shown in FIG. 7, it is necessary to dispose the flexspline 19 with the elastic part 22 facing downward and fit the wave generator 21 into the elastic part 22 from below. In this case, since the wave generator 21 is fitted into the elastic part 22 that is disposed at a lower part of the flexspline 19, a space is created above the wave generator 21, resulting in a longer lubrication path for lubricating the wave generator 21 from an upper side of the first arm 3 than in the joint shaft structure 10 of the embodiment. Moreover, since the wave generator 21 is fitted into the flexspline 19 from below, the wave generator 21 cannot be maintained from above even when the opening 17 is provided in the first arm 3.

Furthermore, in the case of a joint shaft structure 30 of FIG. 7, the outside diameter of the wave generator 21 is larger than the inside diameter of the socket 13 into which the protrusion 11a of the motor 11 is fitted, so that the motor 11 cannot be directly fitted to the base member 2. It is therefore necessary to provide the base member 2 with an opening 31 having an inside diameter larger than the outside diameter of the wave generator 21, and to dispose, between the motor 11 and the base member 2, an adapter 34 that has a protrusion 32 fitted into the opening 31 and a socket 33 into which the protrusion 11a of the motor 11 is fitted.

As a result, the joint shaft structure 30 has a larger number of components and a significantly larger height from a bottom surface of the base member 2 to an upper surface of the first arm 3. Thus, the joint shaft structure 10 and the horizontal articulated robot 1 according to the embodiment have an advantage of being able to shorten the lubrication path, improve the maintainability, omit the adapter 34 used to mount the motor 11 onto the base member 2, and significantly reduce the height from the bottom surface of the base member 2 to the upper surface of the first arm 3.

The case where lubrication is performed by removing the cover 18 has been described in the embodiment. Also when a nipple for supplying grease is attached to the cover 18 or to an upper part of the first arm 3 and lubrication is performed via this nipple, high-viscosity grease can be easily supplied to the wave generator 21 etc. owing to the short lubrication path.

The case where the wave generator 21 is directly fixed to the motor shaft 11b of the motor 11 has been described in the embodiment. The present invention may instead be applied to a case where the wave generator 21 is fixed to a shaft to which the driving force of the motor 11 is transmitted by a driving force transmission mechanism such as a pulley, belt, or gear.

The joint shaft structure 10 in which the first arm 3 is horizontally rotated relative to the base member 2 installed on the installation surface has been illustrated in the embodiment. The present invention may also be applied to a joint shaft structure in which the second arm 4 is horizontally rotated relative to the first arm 3. The second arm 4 can serve as the base member and the first arm 3 can serve as the output shaft member. Thus, the height of the second arm 4 can also be reduced.

From the above-described embodiment, the following invention is derived.

As an aspect of the present invention, a joint shaft structure is provided that includes: a base member; an output shaft member that is supported on one side of the base member so as to be rotatable around a rotational axis; and a strain wave gear reducer that rotates the output shaft member relative to the base member by transmitting rotation of a motor disposed on the base member side to the output shaft member while reducing the speed of the rotation. The strain wave gear reducer includes: a wave generator fixed to a shaft that is rotated around a longitudinal axis coinciding with the rotational axis by a driving force from the motor; a substantially cylindrical flexspline having, at one end, an elastic part which has a shape of a thin-walled cylinder elastically deformable in a radial direction and includes a plurality of external teeth arrayed in a circumferential direction on an outer circumferential surface, and inside which the wave generator is fitted; and a ring gear that is disposed on a radially outer side of the flexspline and fixed to the output shaft member, and has internal teeth meshing with the external teeth. The flexspline is fixed to the base member at the other end that is disposed farther on the base member side than the elastic part.

According to this aspect, when the motor disposed on the base member side is actuated, the rotation of the motor is transmitted to the output shaft member, while the speed of the rotation is reduced, by the strain wave gear reducer, and thus the output shaft member can be rotated around the rotational axis relative to the base member. Specifically, when the shaft is rotated around the longitudinal axis coinciding with the rotational axis by the driving force of the motor, the wave generator fixed to the shaft is rotated.

For example, the wave generator is formed by fixing an elastic bearing to an outer circumference of an elliptical cam, and this wave generator is rotated while radially elastically deforming the thin-walled cylindrical elastic part of the flexspline inside which the wave generator is fitted. The plurality of external teeth is provided on the outer circumference of the elastic part and meshes with the internal teeth of the ring gear disposed on the radially outer side of the elastic part. Since the number of the external teeth and the number of the internal teeth are different from each other by only a small number, each time the wave generator makes one rotation, the ring gear rotates around the rotational axis in an amount corresponding to the difference in number between the internal teeth and the external teeth, causing the output shaft member to which the ring gear is fixed to rotate.

In this case, according to this aspect, the flexspline is fixed to the base member at the other end that is disposed farther on the base member side than the elastic part, and therefore the wave generator is fitted in the elastic part of the flexspline that is disposed at a position away from the base member. Specifically, the distance from an outer surface of the output shaft member, disposed opposite from the base member across the wave generator, to the wave generator and the elastic part can be set to be sufficiently short, and thereby a short lubrication path can be set. As a result, high-viscosity grease can be efficiently supplied to the wave generator and the elastic part by the short lubrication path.

In the above aspect, the output shaft member may have an opening larger than an outside diameter of the wave generator, at a position facing the elastic part in the direction of the rotational axis.

Thus, the wave generator can be fitted inside the flexspline and fixed to the shaft via the opening of the output shaft member, in a state where the shaft is disposed inside the flexspline. This allows easy maintenance and lubrication of the wave generator and the flexspline through the opening.

In the above aspect, the joint shaft structure may further include a cover that closes the opening in an openable manner.

Thus, one can remove the cover to open the opening when maintaining or lubricating the wave generator or the flexspline, and can mount the cover to close the opening after the maintenance or lubrication.

In the above aspect, the shaft may be a motor shaft provided in the motor; and the base member may be provided with a through-hole having an opening diameter smaller than an outside diameter of the wave generator but larger than an outside diameter of the motor shaft, and with a motor mount on which the motor having the motor shaft passed through the through-hole is mounted.

Thus, the wave generator can be fitted inside the elastic part of the flexspline and fixed to the shaft after the motor is placed close to the base member from the opposite side from the flexspline and the motor shaft is disposed inside the flexspline via the through-hole.

This means that it is not necessary to fix the wave generator to the motor shaft in advance when mounting the motor onto the motor mount. Even when the outside diameter of the wave generator is larger than the inside diameter of a socket that is used to position the motor relative to the base member in the motor mount, the motor can be directly mounted onto the base member without using an adapter. Thus, the motor can be placed close to the output shaft member, and thereby the dimension in the direction of the rotational axis can be reduced.

As another aspect of the present invention, a horizontal articulated robot is provided that includes any one of the above-described joint shaft structures, wherein the rotational axis extends along a vertical direction and the output shaft member is disposed above or below the base member.

REFERENCE SIGNS LIST

1 Horizontal articulated robot
2 Base member
3 First arm (output shaft member)
10 Joint shaft structure
11 Motor
11b Motor shaft (shaft)
12 Strain wave gear reducer
14 Motor mount
15 Through-hole
17 Opening
18 Cover
19 Flexspline
20 Ring gear
20a Internal tooth
21 Wave generator
22 Elastic part
22a External tooth
A First axis (rotational axis, longitudinal axis)

The invention claimed is:
1. A joint shaft structure comprising:
a base member;
an output shaft member that is supported on one side of the base member so as to be rotatable around a rotational axis; and
a strain wave gear reducer that rotates the output shaft member relative to the base member by transmitting rotation of a motor, disposed in a hollow part of the base member, to the output shaft member while reducing a speed of the rotation, wherein:
the strain wave gear reducer includes:
a wave generator fixed to a shaft that is rotated around a longitudinal axis coinciding with the rotational axis by a driving force from the motor;
a substantially cylindrical flexspline having a first end and a second end, an elastic part being provided at the first end, the second end being fixed to the base member by a flange extending radially outward from the elastic part, the elastic part having a shape of a thin- walled cylinder elastically deformable in a radial direction and including a plurality of external teeth arrayed in a circumferential direction on an outer circumferential surface, and the wave generator being fitted inside the elastic part; and a ring gear that is disposed on a radially outer side of the flexspline and fixed to the output shaft member, and has internal teeth meshing with the external teeth; and the output shaft member includes:

an opening larger than an outside diameter of the wave generator, at a position adjacent to the elastic part;

a cover that is configured to be mounted over the opening so as to completely close the opening and that is configured to be removed from the opening; and wherein the cover is mounted over the opening without a bolted connection.

2. The joint shaft structure according to claim 1, wherein:

the shaft is a motor shaft provided in the motor; and the base member is provided with a through-hole having an opening diameter smaller than an outside diameter of the wave generator but larger than an outside diameter of the motor shaft, and with a motor mount on which the motor having the motor shaft passed through the through-hole is mounted.

3. A horizontal articulated robot comprising the joint shaft structure according to claim 1, wherein:

the rotational axis extends along a vertical direction; and the output shaft member is disposed above or below the base member.

4. The joint structure according to claim 1, wherein:

the rotation axis extends in a vertical direction;

the output shaft member is disposed above the base member; and the opening in the output shaft member is located vertically above the flexspline.

5. The joint structure according to claim 4, wherein the first end of the flexspline is positioned vertically above the second end.

6. The joint structure according to claim 1, wherein the flange is directly fixed to the base and the flexspline.

7. The joint structure according to claim 1, wherein the cover and the shaft that is rotated around the longitudinal axis are physically separated from one another.

* * * * *